Patented Aug. 14, 1934

1,970,083

UNITED STATES PATENT OFFICE 1,970,083

SULPHURIC ACID ESTER OF ANTHRANOLS

David Alexander Whyte Fairweather and John Thomas, Grangemouth, Scotland, assignors to Scottish Dyes, Limited, Grangemouth, Scotland No Drawing. Application June 24, 1930, Serial No. 463,562. In Great Britain July 1, 1929

6 Claims. (Cl. 260—99.12)

This invention relates to the production and use of chemical substances, more specifically to the production of certain esters and their use, for instance, directly or indirectly in the arts of dyeing, printing and the like.

The object is to provide improved or modified products or improved or modified processes and includes the applications of products in the arts of dyeing, printing or the like and other arts.

The invention is of broad scope and may be regarded as comprising several parts.

The first part of the invention consists in the production of esters of anthranols, their substitution products or derivatives particularly the production of sulphuric esters, for instance by treating the anthranol derivative with pyridine sulphur trioxide preferably in pyridine or analogous methods such as those in which bases other than pyridine are used and substances which will give pyridine sulphur trioxide.

The invention also consists in a process which may be according to the preceding paragraph in which the substituent group, for example, the amino group of β-amino anthranol during the process is protected by acylation for instance by acetylation, the protecting group if desired being removed after esterification.

The invention also consists in a process according to either of the preceding two paragraphs in which the starting anthranols are obtained from the corresponding anthraquinones by treatment with copper and sulphuric acid or the like. Anthranol esters prepared as described above are substantially soluble in water and capable of dyeing fibres directly, the dyeings if desired being treated with oxidizing agents on the fibre.

The invention also consists in processes for the production of esters of anthranols, their substitution products and derivatives substantially as described.

The invention also consists in a process which comprises the employment of esters such as may be made by the processes indicated above in the synthesis of azo dyes, for example, by taking esters of amino-anthranols, diazotizing these and coupling or by taking anthranol esters and coupling these with other diazotized amines.

The invention also consists in a modification of the process of the preceding paragraph which comprises the application of the esters of amino-anthranols, their substitution products and derivatives, for example, as indicated above in the synthesis of dyestuffs not of the azo class, but more related as regards internal structure to the vat dyestuff class.

The invention also consists in the process which comprises the application of products such as may be made by the processes of any of the preceding four paragraphs in the arts of dyeing and printing, and the like, either as dyestuffs or as intermediates for the production of dyestuffs.

The invention also consists in products when made by any of the processes herein described including dyed and printed products or such products as may be made by the obvious chemical equivalents of any of those processes.

The following examples illustrate how the invention may be carried into effect references to parts and percentages being to parts and percentages by weight:—

Example 1

This deals with the production of β-acetyl-amino-anthranol. 25 parts of 2-acetylamino-anthraquinone are dissolved cold in 400 parts of 5 per cent. oleum, 17.5 parts of copper powder are then added keeping the temperature between 20 to 30° C. When all the copper is in the mixture is stirred for one and a half hours at about 20 to 25° C., left to stand for several hours in the cold, poured into water and filtered.

The product is a grey powder insoluble in water but dissolving in alkali with a brownish yellow color and giving a bluish fluorescence in alcohol changing to a yellow solution with alkali.

Example 2

This is an example of the production of a sulphuric ester from β-acetylamino-anthranol. 10 parts of β-acetylamino-anthranol prepared for example by the method of Example 1 are mixed with 15 parts of pyridine sulphur trioxide and 35 parts of pyridine and the whole heated to 85° C. with stirring for one hour. The mass is then steam distilled with 10.5 parts of sodium carbonate to remove the pyridine when the sodium salt of β-acetylamino-anthranol sulphuric acid ester remains in the liquor. It may be isolated for example by salting out.

By boiling with caustic soda the acetyl group is removed and a solution of the sodium salt of a body which is presumably β-amino-anthranol sulphuric acid ester obtained. This ester may be isolated by for example acidifying or salting out. This ester which is a new compound dissolves in the form of its sodium salt in water with a green fluorescence.

Example 3

This is an example of the diazotization of the sodium salt of β-amino-anthranol sulphuric acid ester. 31 parts of the sodium salt of the ester are dissolved in 300 parts of water and 31 parts of concentrated hydrochloric acid are added together with ice. The diazotization is carried out by adding a solution of 7 parts of sodium nitrite in solution in water at about 0° C. The solution changes in color becoming a red brown and the

Example 4

This is an example of the coupling of the diazo compound obtained in Example 3 with the phenol. The solution or suspension of the diazo compound obtained from 31 parts of the sodium salt of β-amino-anthranol sulphuric acid ester is run with stirring into a solution of 15.5 parts of β-naphthol in 120 parts of 10 per cent. caustic soda. The mixture is warmed to 60° C. and the dyestuff salted out by the addition of an equal volume of saturated salt solution.

Example 5

This is an example of the application of the product obtained according to Example 4. Sufficient of the dyestuff to correspond to 1 part of the dry material is dissolved in 100 parts of water, the temperature raised to about 60° C. A cotton hank weighing 10 parts is then entered into the dyebath and worked at about 60 to 65° C. The product has good affinity giving a bluish red shade.

Example 6

This is an example of the production of an orange shade by the treatment of the dyeing obtained in Example 5 with an oxidizing agent. A cotton hank as described in Example 5 is treated for about 5 minutes in a 1 per cent. solution of acid ferric chloride at 65° C. The color changes to a bright orange.

Example 7

This is an example of the utilization of the product obtained according to Example 2 as an intermediate. 31 parts of the sodium salt of β-amino-anthranol sulphuric acid ester are dissolved in 300 parts of water, cooled to 5 to 10° C. and 80 parts of the 12 per cent. solution of sodium hypochlorite slowly added with stirring. After stirring for half an hour at room temperature an equal volume of saturated salt solution is added and the dark brown precipitate is filtered off and washed with salt solution.

This substance dissolves in water to give a brown solution with a greenish yellow fluorescence. It appears that probably in the above treatment 2 molecules of the ester are linked together to form a body of the hydroazine type. The product appears to be a sulphuric acid ester and can be used as a dyestuff or as an intermediate for the production of other dyestuffs. When used as a dyestuff which can be done from solution in water brown shades are obtained.

The brown substance either in substance or on the fibre on boiling with dilute mineral acids is converted to a less soluble product dissolving in caustic soda with a bluish color changing to reddish on treatment with acids. When this treatment is carried out on the fibre a blue dyeing is obtained changing to a bright pink with acid.

The boiling with dilute mineral acids above referred to appears to have the effect of removing the ester groups.

Example 8

When the brown substance referred to in Example 7 is treated with an oxidizing agent such as chromic acid and 10 per cent. sulphuric acid a greenish yellow body is obtained, convertible to a blue vat dyestuff with reducing agents for example alkaline sodium hydrosulphite. This blue product appears to below to the dianthraquinone-1.2.1'2'-dihydroazine class.

Example 9

In this example α-acetylamino-anthranol is substituted for the β isomer in Example 2, and the corresponding ester is obtained. The acetyl group may be removed as in Example 2, giving α-amino-anthranol sulphuric acid ester which may be used to give azo dyes as in Examples 3, 4 and 5.

Example 10

This is an example of the production of an amino-chloranthranol sulphuric acid ester. The starting material is the anthranol made by reduction of 2-acetyl-amino-3-chloranthraquinone by the method of Example 1. The anthranol so obtained is substituted for β-acetyl-amino-anthranol in Example 2, and the esterification carried out as described therein.

The brown solution so obtained is boiled with 2 per cent. of its weight of caustic soda for 45 minutes when the acetyl group is removed, the solution becoming a deeper brown.

This solution may be used as in Example 3, for the production of azo dyes, or directly as a dyestuff as in the following example.

Example 11

This example describes the use of the ester prepared as in the previous example as a wool dyestuff.

1.7 parts of the ester are dissolved in 3000 parts of water and 80 parts of woolen cloth entered at 40° C. The temperature is raised during half an hour to the boil, and the bath exhausted with acetic acid. The brown dyeing so obtained is treated with 2 per cent. sulphuric acid for five minutes at 90° C. to remove the ester group. If instead of this hydrolytic treatment the dyeing is immersed in an acid oxidizing bath, for instance, one made up of one per cent. ferric chloride and two per cent. sulphuric acid, for a few minutes at 80 to 90° C. a deep chocolate brown dyeing results.

Example 12

This is an example of the production of sulphuric acid ester of anthrone itself.

10 parts of anthrone are heated with 15 parts of pyridine sulphur trioxide in 35 parts of dry pyridine for one hour at 85° C. The product is steam-distilled with 7.5 parts of caustic soda in 200 parts of water, whereby a deep yellow solution with a faint violet fluorescence is obtained. On cooling this solution deposits the sodium salt of anthranol sulphuric acid ester in yellow prisms. Complete separation from the liquor may be effected by salting out.

Example 13

This is an example of the esterification of a substituted anthrone.

5 parts of 4-chlor-9-anthrone (obtained by the alkaline reduction of 1-chloranthraquinone as described in Bull. Soc. Chim. IV. Vol. XLV. P. 131) are heated for one hour at 80° with 10 parts of pyridine sulphur trioxide, and 25 parts of pyridine, the melt being subsequently steam-distilled with 6.5 parts of sodium carbonate in aqueous solution. The product separates on the addition of salt solution in the form of glistening straw colored plates.

*Example 14*

12 parts of the sodium salt of β-sulpho-anthrone (made by acid reduction of β-sulpho-anthraquinone) is heated with 10 parts of pyridine sulphur trioxide and 50 parts of pyridine to 85° C. for one hour. After steam-distillation with 7 parts of sodium carbonate the product may be salted out with potassium carbonate. It is a light brown crystalline substance having a considerably greater solubility in water than the starting material. In dilute solutions it shows a violet fluorescence.

*Example 15*

This is another example of the production of an ester of anthranol, the anthranol being of indanthrone type.

3.4 parts of anthraquinone anthranol 1.2:2′:1′ dihydroazine is mixed with 7 parts of pyridine sulphuric anhydride and 15 parts of pyridine, and the mixture stirred at 90° C. for one hour. The color of the melt changes towards red, and when the esterification is finished it is steam distilled with water containing 3.6 parts of caustic soda to remove pyridine. The product appears in small dark red crystals with a golden reflex and is filtered off. It is sparingly soluble in hot water to a blue-red solution, but dissolves freely in warm alcohol.

The ester dyes wool a red shade from an acid bath, which changes to purple when immersed in a 2 per cent. solution of concentrated hydrochloric acid at 80° C., which can be further oxidized.

*Example 16*

This is an example of the production of an ester derivative, other than a sulphuric ester.

10 parts of anthrone are dissolved in 200 parts of water containing 4 parts of caustic soda at 100°. When the solution is complete 7 parts of sodium chlor acetate are added, and the whole is kept at 90–95° C. for three hours. It is then filtered hot, and the filtrate treated in the cold with acetic acid. The product then separates out, and is filtered off. It can be redissolved in sodium carbonate, filtered, and finally re-precipitated as the sodium salt by the addition of sodium chloride.

This substance dissolves in water giving a yellowish solution with a blue fluorescence.

*General*

The present invention is to be regarded as broad in its various stages and one stage is not restricted to the use of starting materials such as have been prepared by one of the intermediate stages, this applying particularly to the dyeing stages.

In connection with the azo type of body referred to above we have found that in the case of amino-anthranol esters it is possible to diazotize these without removing the ester groups, for example, the sulphuric ester of β-amino-anthranol may be diazotized and the product coupled with β-naphthol or with other phenols, amines and coupling constituents including arylides and other derivatives of oxy-naphthoic acids.

The products obtained after coupling will dye directly from aqueous solution and the dyeings may be converted to other shades by treatment with oxidizing agents on the fibre.

These azo derivatives have the advantage amongst others that they may be used along with soluble esters of vat-dyestuffs or in the same way as the products in co-pending British application No. 4328/29 (British Patent No. 333,506) namely, esters of reduced quinones such as anthraquinones, benzoquinones and vat dyestuffs, including indigoid dyestuffs, the products containing in addition azo linkages. The dyestuffs may also be synthesized in substance or on the fibre.

When the azo dyestuffs are treated with acids or oxidizing agents or acid oxidizing agents the ester groups may be hydrolyzed and in some cases the anthranol nucleus oxidized to an anthraquinone.

Referring to the use of the anthranol esters for dyestuffs not of the azo class, but more related as regards internal structure to the vat dyestuff class we find for example that by taking the sulphuric ester of β-amino-anthranol and treating it with alkaline oxidizing agents that a brown product is obtained which is soluble in water and has affinity for fibres. This brown product probably consists of 2 molecules of the ester joined together to form a derivative of the dihydroazine or azine type. It apparently still contains the ester groups and on heating with dilute acids a very dark blue precipitate is obtained. This is soluble in alkali to a bluish solution changing to a reddish shade on acidification and precipitating.

On further addition of alkali a blue solution is again obtained. This alkali sensitive product on treatment with oxidizing agents is converted to a greenish blue product of the azine type and this in turn to a blue vat dyestuff probably belonging to the dianthraquinone-dihydroazine series, by treatments with a reducing agent for example alkaline hydrosulphite. These changes can be carried out in substance or on the fibre.

If instead of using an alkaline oxidizing agent we use an acid oxidizing agent other derivatives appear to be obtained, particularly derivatives of analogous structure to flavanthrone. Thus for example by heating with acid cupric chloride or acid ferric chloride flavanthrone itself is obtained. The product may be contaminated with some of the products already mentioned as obtained in the alkaline oxidation treatment. These reactions again may be carried out on the fibre or the flavanthrone or flavanthrone derivatives may be synthesized in substance and then used as dyestuffs.

In referring to anthranols it is emphasized that the anthranols readily tautomerize to anthrones so that in some cases our bodies may be present in the anthrone rather than the anthranol form.

The invention is not limited when referring to esters to the sulphuric esters.

Having now described our invention, what we claim as new and desire to secure by Letters Patent is:—

1. Beta-amino-anthranol-sulphuric acid ester.
2. The process which consists in reacting together an anthraquinone, copper and sulphuric acid, and then reacting the product and pyridine-sulphurtrioxide.
3. Compounds having the constitution

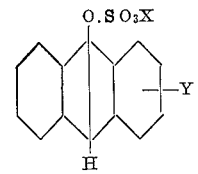

where X represents an alkali metal or hydrogen and Y is chosen from the group consisting of hydrogen, chlorine, sulpho-, amino- and acetylamino.

4. Compounds having the constitution

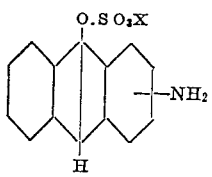

where X represents an alkali metal or hydrogen.

5. Compounds having the constitution

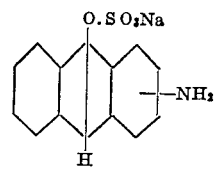

6. The process which consists in reacting together a chemical compound containing an anthranol and pyridine-sulphur trioxide.

DAVID ALEXANDER WHYTE
FAIRWEATHER.
JOHN THOMAS.